United States Patent
Scholte-Wassink

(10) Patent No.: US 12,123,392 B2
(45) Date of Patent: Oct. 22, 2024

(54) METHOD OF ASSEMBLING OR DISASSEMBLING A ROTOR BLADE OF A WIND TURBINE

(71) Applicant: General Electric Renovables Espana, S.L., Barcelona (ES)

(72) Inventor: Hartmut Scholte-Wassink, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/042,495

(22) PCT Filed: Aug. 23, 2021

(86) PCT No.: PCT/EP2021/073293
§ 371 (c)(1),
(2) Date: Feb. 22, 2023

(87) PCT Pub. No.: WO2022/043272
PCT Pub. Date: Mar. 3, 2022

(65) Prior Publication Data
US 2023/0323859 A1    Oct. 12, 2023

(30) Foreign Application Priority Data
Aug. 24, 2020 (EP) .................................... 20192458

(51) Int. Cl.
*F03D 13/10* (2016.01)
*F03D 1/06* (2006.01)

(52) U.S. Cl.
CPC ........... *F03D 13/10* (2016.05); *F03D 1/0658* (2013.01); *F05B 2230/70* (2013.01); *F05B 2240/916* (2013.01)

(58) Field of Classification Search
CPC ...... F03D 13/10; F03D 13/104; F03D 13/018; F03D 13/139; F03D 1/06; F03D 1/065;
(Continued)

(56) References Cited

U.S. PATENT DOCUMENTS

| 10,988,351 B2 | 4/2021 | Aitken et al. |
| 11,015,573 B2 | 5/2021 | Bech |

(Continued)

FOREIGN PATENT DOCUMENTS

| EP | 3563053 A1 | 11/2019 |

OTHER PUBLICATIONS

European Search Report Corresponding to EP20192458 on Feb. 9, 2021.
PCT International Search Report & Written Opinion Corresponding to PCT/EP2021/073293 on Dec. 3, 2021.

*Primary Examiner* — Elton K Wong
(74) *Attorney, Agent, or Firm* — Dority & Manning, P.A.

(57) ABSTRACT

A method (800,900) of assembling or disassembling a rotor blade of a wind turbine, the wind turbine comprising a tower, a nacelle mounted on the tower and a rotor coupled to the nacelle, the rotor having a rotor hub and a rotor blade, the rotor blade comprising a first blade segment connected with the rotor hub, a second blade segment, wherein the second blade segment is configured for joining to the first blade segment such that the second blade segment extends from the first blade segment towards a blade tip of the rotor blade, and a releasable locking device configured for joining the second blade segment to the first blade segment, the releasable locking device comprising a structural member of the second blade segment, the structural member being configured for engaging a further structural member of the first blade segment for releasable locking with the further structural member, wherein a fastening device of the second blade segment is arranged on the structural member; the (Continued)

method comprising raising (950) or lowering (860) the second blade segment using a connecting device fastened to the fastening device of the second blade segment, wherein the connecting device extends through a root of the rotor blade and at least partially through the first blade segment to the second blade segment.

15 Claims, 6 Drawing Sheets

(58) Field of Classification Search
CPC .. F03D 1/0658; F03D 80/011; F05B 2230/60; F05B 2230/70; F05B 2240/916; B66C 1/108
See application file for complete search history.

(56) References Cited

U.S. PATENT DOCUMENTS

| | | |
|---|---|---|
| 11,118,574 B2 | 9/2021 | Baker |
| 11,555,483 B2 * | 1/2023 | Avaldi ................... F03D 80/50 |
| 2010/0254813 A1 * | 10/2010 | Dawson ................. F03D 13/10 29/889.1 |
| 2011/0206510 A1 * | 8/2011 | Langen ................ F03D 1/0658 416/61 |
| 2014/0360015 A1 | 12/2014 | Lohan et al. |
| 2017/0045029 A1 * | 2/2017 | Senthoorpandian .... F03D 80/50 |
| 2022/0268252 A1 * | 8/2022 | Brice ................... F03D 1/0658 |

* cited by examiner

METHOD OF ASSEMBLING OR DISASSEMBLING A ROTOR BLADE OF A WIND TURBINE

RELATED APPLICATIONS

The present application claims priority to PCT Application Serial Number PCT/EP2021/073293, filed on Aug. 23, 2021, which claims priority to EP Application No. 20192458.6, filed on Aug. 24, 2020. Both applications are incorporated by reference herein.

FIELD

The present disclosure relates generally to wind turbines, and more particularly to a method of assembling or disassembling a rotor blade of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The size of rotor blades contributes to the energy efficiency of wind turbines. In particular, an increase in rotor blade size can increase the energy production of a wind turbine. The economic benefits of increased wind turbine sizes or rotor blade sizes must be weighed against respective costs of manufacturing, transporting, assembly or repair of the wind turbines. One strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location.

Over time, the rotor blades may become worn or damaged due to loads and forces from the wind acting on the blades. The repair of the blades can be very time-consuming and labor intensive. Often, cranes are needed to grip the blades and lower the blades from a rotor hub of a wind turbine to the ground such that the rotor blades can be replaced, or such that maintenance or repair of the blades can be performed on the ground or at a maintenance station. However, the use of such cranes can increase costs associated with the aforementioned repair or replacement procedures.

Accordingly, the present disclosure is directed to a method of assembling or disassembling a rotor blade of a wind turbine that can provide a safe, fast and/or cost-efficient repair, maintenance or exchange of the rotor blade or of rotor blade segments.

BRIEF DESCRIPTION

Aspects and advantages of the invention will be set forth in part in the following description, or may be obvious from the description, or may be learned through practice of the invention.

In one aspect, the present disclosure is directed to a method of assembling or disassembling a rotor blade of a wind turbine. The wind turbine includes a tower, a nacelle mounted on the tower and a rotor coupled to the nacelle, the rotor having a rotor hub and a rotor blade. The rotor blade includes a first blade segment connected with the rotor hub, a second blade segment, wherein the second blade segment is configured for joining to the first blade segment such that the second blade segment extends from the first blade segment towards a blade tip of the rotor blade, and a releasable locking device configured for joining the second blade segment to the first blade segment, the releasable locking device comprising a structural member of the second blade segment, the structural member being configured for engaging a further structural member of the first blade segment for releasable locking with the further structural member, wherein a fastening device of the second blade segment is arranged on the structural member. The method includes raising or lowering the second blade segment using a connecting device fastened to the fastening device of the second blade segment, wherein the connecting device extends through a root of the rotor blade and at least partially through the first blade segment to the second blade segment. It should be understood that the method may further include any of the additional steps and/or features as described herein.

In another aspect, the present disclosure is directed to a rotor blade for a wind turbine, the rotor blade having at least two blade segments including a first blade segment, a second blade segment joined to the first blade segment, the second blade segment extending from the first blade segment towards a blade tip of the rotor blade, and a releasable locking device configured for joining the second blade segment to the first blade segment, the releasable locking device comprising a structural member of the second blade segment, the structural member being configured for engaging a further structural member of the first blade segment for releasable locking with the further structural member. The rotor blade is configured for receiving a connecting device such that the connecting device extends through a root of the rotor blade and at least partially through the first blade segment to the second blade segment. The second blade segment includes a fastening device for fastening the connecting device to the second blade segment, wherein the fastening device is arranged on the structural member of the second blade segment. It should be understood that the rotor blade may further include any of the additional features as described herein.

In yet another aspect, the present disclosure is directed to a wind turbine including a rotor, the rotor including a rotor hub; and at least one rotor blade according to embodiments described herein, the rotor blade being connected with the rotor hub. It should be understood that the wind turbine may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
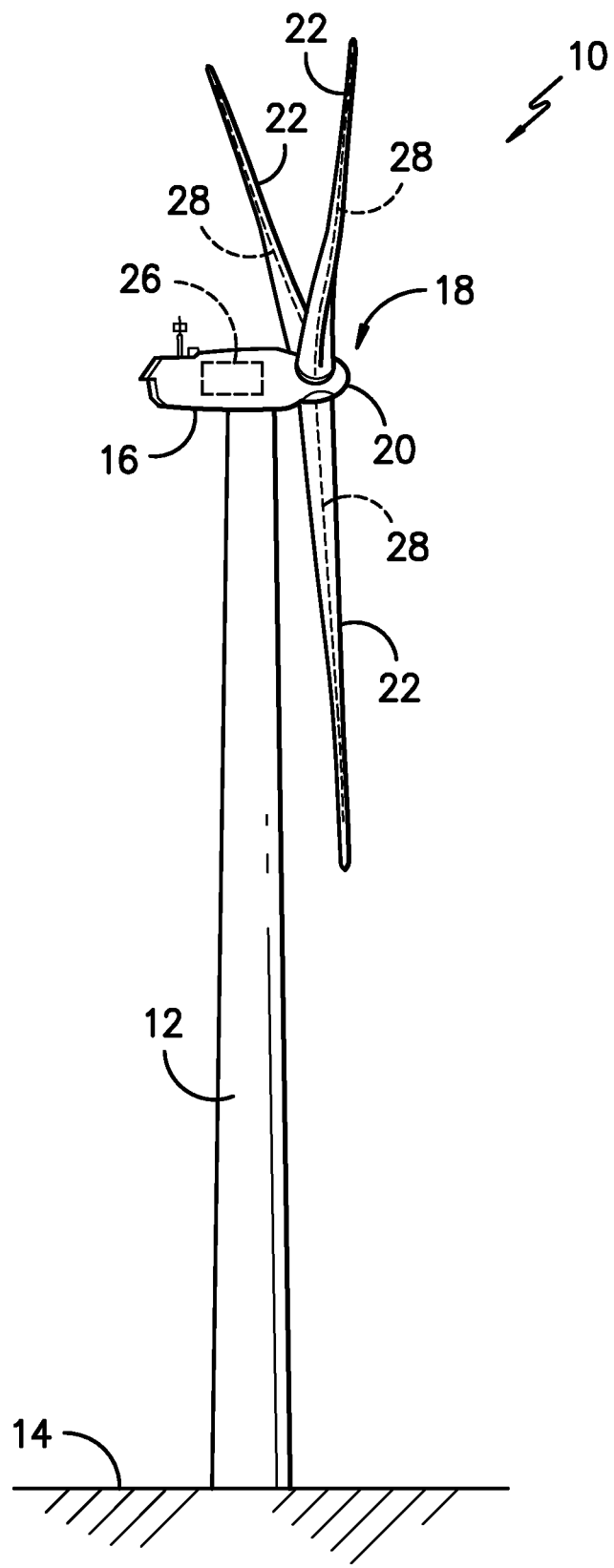
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10 according to the present disclosure. As shown, the wind turbine 10 generally includes a tower 12 extending from a support surface 14 (herein also referred to as ground), a nacelle 16 mounted on the tower 12, and a rotor 18 coupled to the nacelle 16.

As shown in FIG. 1, the rotor 18 includes a rotatable rotor hub 20 and at least one rotor blade 22 coupled to and extending outwardly from the rotor hub 20. For example, in the illustrated embodiment, the rotor 18 includes three rotor blades 22. However, in an alternative embodiment, the rotor 18 may include more or less than three rotor blades 22. Each rotor blade 22 may be spaced about the rotor hub 20 to facilitate rotating the rotor 18 to enable kinetic energy to be transferred from the wind into usable mechanical energy, and subsequently, electrical energy. For instance, the rotor hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
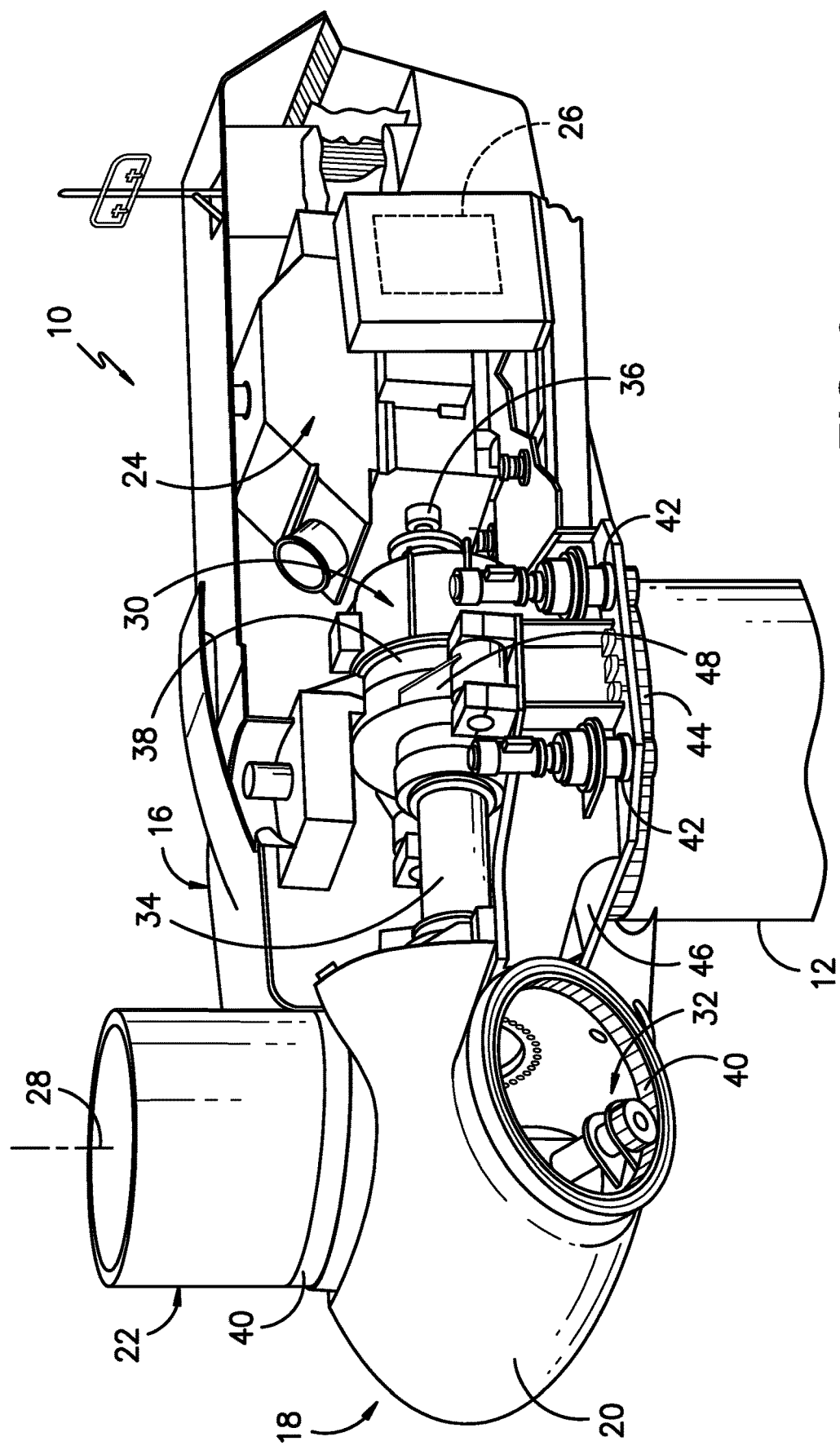
FIG. 2 illustrates a simplified, internal view of a nacelle of a wind turbine, particularly illustrating the nacelle during normal operation.

Referring now to FIG. 2, a simplified, internal view of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the rotor hub 20. Thus, the gearbox 30 converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

During operation of the wind turbine 10, the rotor blades 22 may become worn or damaged due to loads and forces from the wind acting on the rotor blades 22. In particular, the blade tips of the rotor blades 22 or parts of the rotor blades 22 near the blade tips may be subject to high speeds and wear. The rotor blades 22 may be replaced or may be serviced, e.g., by grinding and re-painting the rotor blades 22. However, often blade-lifting cranes are used to raise the blades up to the rotor hub 20 or lower the blades down from the rotor hub 20. As such, the present disclosure is directed to a method of assembling or disassembling a rotor blade of a wind turbine and a rotor blade for a safe, fast and/or cost efficient repair, maintenance or exchange of rotor blade segments, particularly of tip segments.

According to embodiments of the present disclosure, the rotor blade 22 includes at least two blade segments, particularly exactly two. In some embodiments, the rotor blade 22 can include more than two blade segments, for example exactly three blade segments or exactly four blade segments. The at least two blade segments include a first blade segment 50 and a second blade segment 52. The second blade segment 52 can be joined to the first blade segment 50 such that the second blade segment extends from the first blade segment 50 towards a blade tip 54 of the rotor blade 22. The rotor blade 22 can extend along the pitch axis 28 from a root 56 of the rotor blade 22 to a blade tip 54 of the rotor blade 22. In embodiments, the rotor blade 22 is connected or is configured to be connected to the rotor hub 20. For example, the root 56 can be connected to a pitch bearing 40 of the rotor hub 20 (FIG. 2). In some embodiments, the first blade segment 50 can include the root 56 of the rotor blade 22. In further embodiments, the first blade segment may be joined in a direction towards the root to a root-side blade segment and in a direction towards the blade tip to the second blade segment.

In embodiments, the second blade segment 52 is a tip segment including the blade tip 54. In further embodiments, the second blade segment 52 may be an intermediate blade segment extending between a first blade segment and a further blade segment.

Figure 3:
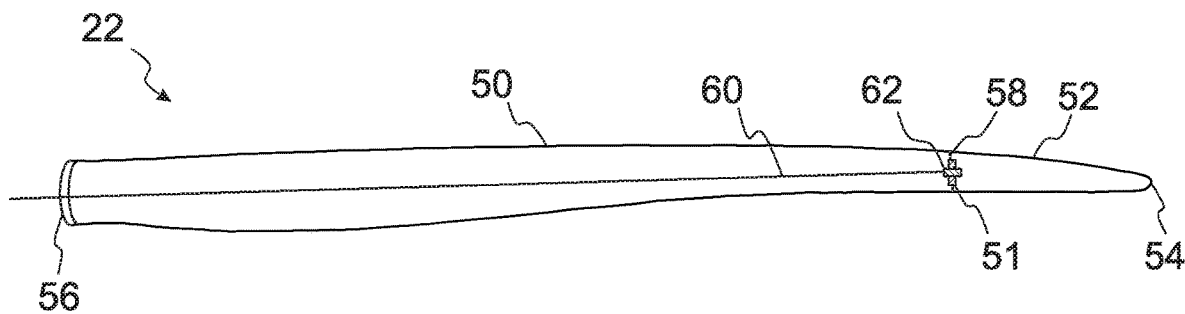
FIG. 3 illustrates a sectional view of a rotor blade according to embodiments of the present disclosure.

For example, FIG. 3 illustrates a sectional view of a rotor blade 22 with a first blade segment 50 and a second blade segment 52. The first blade segment 50 extends from the root 56 to the second blade segment 52. At a split line 58, the first blade segment 50 may be joined via a joint 51 to the second blade segment 52. The second blade segment 52 extends from the first blade segment 50 to the blade tip 54 of the rotor blade 22.

According to embodiments, the rotor blade 22 is configured for receiving a connecting device 60 such that the connecting device 60 extends through the root 56 of the rotor blade 22 and at least partially through the first blade segment 50 to the second blade segment 52. In particular, the rotor blade 22 may include inner blade walls defining an inner volume of the rotor blade 22, the inner volume extending at least partially through the first blade segment 50. The inner blade walls may be configured or shaped to form a cavity extending from the root 56 to the second blade segment 52. In particular, the cavity may be open to an inside of the rotor hub 20. If the second blade segment 52 is not joined to the first blade segment 50, the cavity may be open to an inside of the rotor hub 20 and on a blade tip-side end of the first blade segment 50.

In embodiments of the present disclosure, the second blade segment 52 includes a fastening device 62 for fastening the connecting device 60 to the second blade segment 52. In some embodiments, the fastening device 62 is arranged inside the rotor blade 22, particularly if the second blade segment 52 is joined to the first blade segment 50. The fastening device 62 may be positioned at a cavity formed by inner blade walls of the rotor blade 22, particularly by inner blade walls of the first blade segment 50. In embodiments, the fastening device 62 is arranged at least partially inside the first blade segment 50. The connecting device 60 may reach partially through the first blade segment 50 to the fastening device 62.

According to some embodiments, the connecting device 60 includes a fastening element to be fastened to the fastening device 62 of the second blade segment 52. In particular, the fastening element can be arranged at an end of the connecting device 60. The fastening device 62 may be configured to provide a connection of the second blade segment 52 with the connecting device 60, in particular with the fastening element of the connecting device 60. In exemplary embodiments, the fastening device 62 may include a screw-type fastening device, a hooking-type fastening device and/or a pin joint-type fastening device. In particular, a screw-type fastening device may include a threaded hole and/or a threaded bolt. A hooking-type fastening device may include a hook and/or a hoisting eye. A pin joint-type fastening device may include a pinhole for connecting the connecting device 60 to the fastening device 62 using a pin. For example, the fastening device 62 may include a threaded hole configured for a connection with a threaded bolt of the fastening element of the connecting device 60. In some embodiments, the fastening element 82 may be a hook, a hoisting eye or a loop of the connecting device 60.

In embodiments, the fastening device 62 can be configured such that the connection between the connecting device 60 and the second blade segment 52 can support the weight of the second blade segment 52. The second blade segment may have a weight of more than 200 kg, particularly more than 400 kg or more than 600 kg, and/or less than 3000 kg, particularly less than 2000 kg or less than 1000 kg.

Embodiments of the present disclosure are particularly configured for raising or lowering the second blade segment 52 using a connecting device 60 arranged through the first blade segment 50. In particular, the second blade segment 52 may be lowered from the first blade segment 50, the first blade segment being connected to the rotor hub 20, down to the support surface 14 or the second blade segment 52 may be raised from the support surface 14 up to a first blade segment 50. More particularly, the second blade segment 52 may be raised or lowered according to methods described herein. Embodiments described herein may provide the advantage that a second blade segment can be raised, lowered or exchanged in a fast and reliable manner, particularly without gripping an outer hull of the blade and/or without using a blade-lifting crane.

According to some embodiments, the fastening device 62 is a releasable fastening device. A releasable fastening device can allow for a release of the connecting device 60 after raising or lowering the second blade segment 52. The connecting device 60 may be re-used for raising or lowering more than one blade segment.

In some embodiments, the connecting device 60 remains fastened to the second blade segment 52 while the second blade segment 52 is joined to the first blade segment 50. In particular, the connecting device 60 may remain at least partially within the rotor blade 22 during operation of the wind turbine 10. Leaving the connecting device 60 attached to the second blade segment 52 may increase the velocity of disassembling the rotor blade 22 or exchanging the second blade segment 52.

Figure 4:
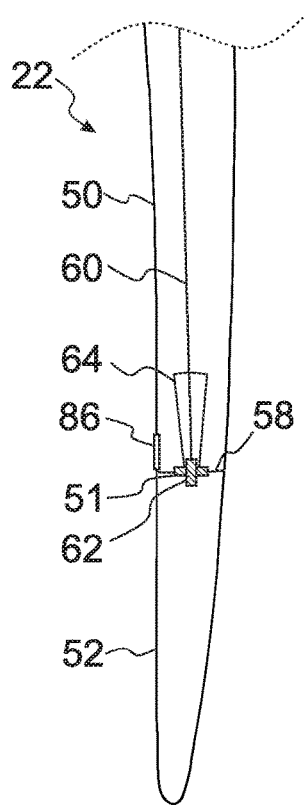
FIGS. 4 and 5 illustrate sectional views of rotor blades according to further embodiments of the present disclosure.

In embodiments, the first blade segment 50 includes a guiding device. The guiding device may be configured for guiding the connecting device 60 towards the fastening device 62. The guiding device may extend along a direction of the pitch axis 28. In some embodiments, the guiding device may include a guiding funnel 64, as shown for example in FIG. 4. The guiding funnel 64 may have a first inner diameter at a root-side end of the guiding funnel and a second inner diameter at a blade tip-side end of the guiding funnel, wherein the first inner diameter is larger than the second inner diameter.

Figure 5:
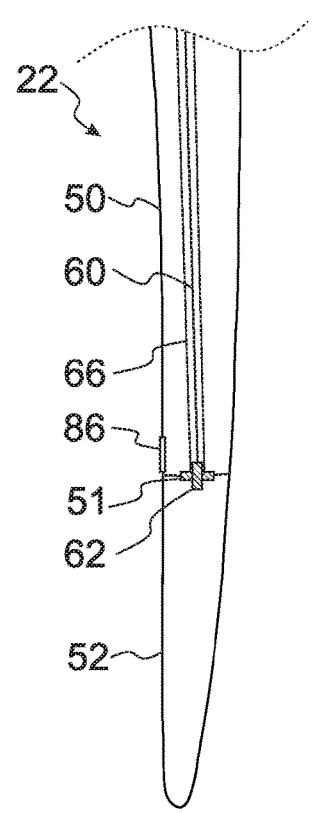

According to some embodiments, the guiding device includes a guiding pipe 66, as shown for example in FIG. 5. The guiding pipe 66 may extend along a longitudinal direction of the rotor blade 22, in particular in a direction of the pitch axis 28 of the rotor blade 22. The guiding pipe 66 can be configured for guiding the connecting device 60 to the fastening device 62 of the second blade segment 52. For example, the guiding pipe 66 may extend along at least 80% of the length of the first blade segment 50, particularly along at least 90% or along at least 95% of the length of the first blade segment 50. In some embodiments, the guiding pipe may extend from the root 56 of the rotor blade 22 to the second blade segment 52, particularly to the fastening device 62, or to a joint 51 joining the first blade segment 50 and the second blade segment 52. The guiding pipe 66 may be comprised of a synthetic material, e.g., plastics. In some embodiments, the connecting device 60 may be retracted through the guiding pipe 66 towards the rotor hub 20 after joining the second blade segment 52 to the first blade segment 50. In further embodiments, the connecting device 60 may be retained within the guiding pipe 66 after joining the second blade segment 52 to the first blade segment 50, particularly during operation of the wind turbine 10.

In some embodiments, the rotor blade 22, particularly the first blade segment 50, includes a blade access hatch 86. The blade access hatch 86 may be configured for accessing the fastening device 62 from outside the rotor blade 22. For example, service personnel may open the blade access hatch 86 from outside the rotor blade 22 and fasten the connecting device 60 to the second blade segment 52 using the fastening device 62. The blade access hatch 86 can be positioned in an outer hull of the rotor blade 22. The blade access hatch 86 may be positioned in a region of the fastening device 62 and/or in a region of a guiding device, particularly in a region of a blade tip-side end of the guiding device. A "region" may be understood for example as an axial region with respect to the pitch axis 28.

In embodiments, the connecting device 60 can include for example a rope such as a synthetic rope, e.g., a Nylon rope, or a wire rope, e.g., a steel rope. In some embodiments the connecting device 60 may include a wire or a chain. The connecting device 60 may have a length of at least 90% of the height of the tower 12 relative to the support surface 14, particularly of at least the height of the tower or of at least twice the height of the tower 12. The connecting device 60 can include a fastening element at a first end of the connecting device 60. The connecting device 60 is movable, particularly extendable and/or retractable. For example, the connecting device 60 may be extended or retracted using a winch. The connecting device 60 can be a pulling device, particularly for pulling the second blade segment 52 during raising or lowering of the second blade segment 52. In embodiments, the connecting device 60 can be configured to support at least the weight of the second blade segment 52.

According to embodiments, the second blade segment 52 is joined to the first blade segment 50 by a joint 51 of the rotor blade 22, particularly via a releasable locking device. A releasable locking device may be configured for mechanically connecting the second blade segment 52 to the first blade segment 50. In embodiments, the releasable locking device may include at least one of a flange joint, a bolted joint and a pin joint. For example, a flange joint or a bolted joint may include flanges on the first blade segment 50 and on the second blade segment 52, the flanges being joined, e.g., using bolts. In some embodiments, a bolted joint may include bolts with threads at either ends of the bolts to be connected to threads of the first blade segment 50 and the second blade segment 52. The bolted joint may be stabilized by spacer elements mounted onto the bolts, particularly between the first blade segment 50 and the second blade segment 52. In some embodiments, the releasable locking device may include a pin joint. The pin joint may include mechanically interlocking joint elements, particularly a first pinhole of the first blade segment 50, a second pinhole of the second blade segment 52, and a joining pin configured for insertion through the first pinhole and the second pinhole, particularly in a chordwise direction.

Figure 6A:
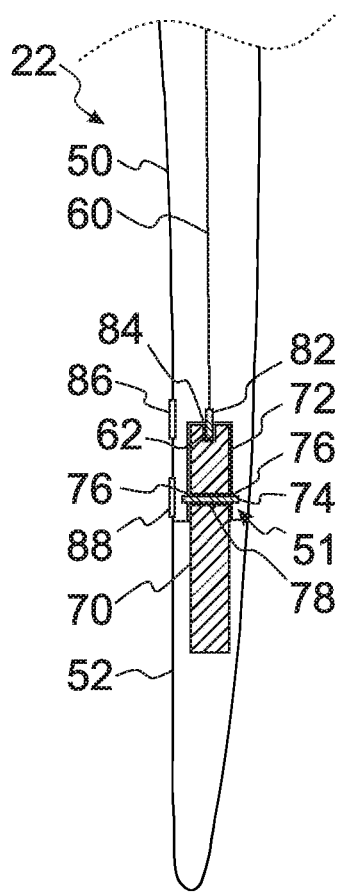
FIGS. 6A and 6B illustrate sectional views of a rotor blade according to exemplary embodiments with blade segments in a joined state and in a released state.
Figure 6B:
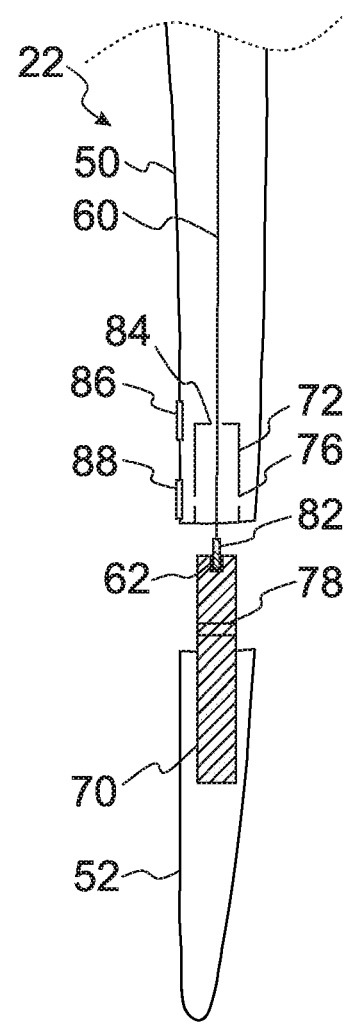

According to embodiments, the releasable locking device includes an interlocking device for interlocking the first blade segment 50 and the second blade segment 52, for example one or more pinholes and a pin (as shown, e.g., FIGS. 6A and 6B). In embodiments, the interlocking device and/or the fastening device 62 may be arranged axially offset from the split line 58 of the rotor blade 22, for example axially offset in a direction towards the hub 20. In the rotor blade 22, the fastening device 62 may be arranged axially offset with respect to the interlocking device, particularly axially offset in a direction towards the hub 20.

In embodiments, the releasable locking device includes a structural member of the second blade segment 52. The fastening device 62 can be arranged on the structural member of the second blade segment 52. In particular, the fastening device 62 can be mounted to or mounted on the structural member of the second blade segment 52. The structural member may be configured for supporting at least the weight of the second blade segment 52. The structural member may be connected to a shell of the second blade segment 52. The releasable locking device can include a further structural member of the first blade segment 50. The structural member of the second blade segment 52 can be configured for engaging the further structural member of the first blade segment 50, particularly for a releasable connection with or for releasable locking with the further structural member.

FIGS. 6A and 6B illustrate an exemplary embodiment of a rotor blade 22 according to the present disclosure. More specifically, FIG. 6A shows a first blade segment 50 and a second blade segment 52 in a joined state. The first blade segment 50 and a second blade segment 52 can be joined by a joint 51, particularly by a releasable locking device and more particularly by a pin joint.

In some embodiments, which can be combined with other embodiments described herein, a releasable locking device, particularly a pin joint, includes a male structural member 70, a female structural member 72 and/or a joining pin 74. In embodiments, the second blade segment 52 may include the male structural member 70, particularly as a structural member of the second blade segment 52 according to embodiments described herein. For example, the male structural member 70 may include a beam. The male structural member 70 may extend in a direction of the pitch axis 28. The first blade segment 50 may include the female structural member 72, particularly as a further structural member of the first blade segment 50 according to embodiments described herein. The female structural member may include a receiving structure configured to receive the male structural member 70. In the joined state, the male structural member 70 of the second blade segment 52 may be inserted in the female structural member 72 of the first blade segment 50. In embodiments, the female structural member 72 includes a first pinhole 76 and the male structural member 70 includes a second pinhole 78. In the joined state, the first pinhole 76 and the second pinhole 78 may be co-localized at an axial position relative to the pitch axis 28. The joining pin 74 may be inserted through the first pinhole 76 and the second pinhole 78, particularly in a chordwise direction. In particular, the joining pin 74 may be inserted through more than one first pinhole 76 (FIG. 6A) and/or more than one second pinhole 78. Inserting the joining pin 74 through the first pinhole 76 and the second pinhole 78 may join or mechanically interlock the first blade segment 50 and the second blade segment 52. Removing the joining pin 74 from the first pinhole 76 and the second pinhole 78 may release the joint 51. Inserting the joining pin 74 and/or removing the joining pin 74 may be performed manually, e.g., through a pin access hatch 88.

According to embodiments, the fastening device 62 may be positioned or arranged on the male structural member 70 such that the fastening device 62 is accessible from inside the first blade segment 50. For example, the female structural member 72 may include an opening 84 positioned such that the connecting device 60 can reach through the opening 84 to the fastening device 62. In FIG. 6A, the fastening device 62 includes a threaded hole in the male structural member 70. A fastening element 82 of the connecting device 60, e.g., a bolt, is fastened to the fastening device 62. More particularly, the bolt of the fastening element 82 is screwed into the threaded hole of the fastening device 62, particularly through the opening 84 of the female structural member 72. Fastening the fastening element 82 to the fastening device 62 may be performed for example manually through the blade access hatch 86. In some embodiments, the blade access hatch 86 may be configured for accessing the fastening device 62 and the releasable locking device, particularly a joining pin 74.

FIG. 6B illustrates the rotor blade 22 of FIG. 6A with joint 51 in a released state and the second blade segment 52 during raising or lowering of the second blade segment 52. For example, the second blade segment 52 may be lowered from the first blade segment 50 down towards a support surface 14 beneath the rotor 18. In FIG. 6B, the connecting device 60 has been fastened to the fastening device 62 and the joining pin 74 has been removed to release the joint 51. An additional length of the connecting device 60 has been provided by a winch (not shown in FIG. 6B) to lower the second blade segment 52 towards the support surface 14. Even though not shown in FIGS. 6A and 6B, it should be understood that the rotor blade 22, e.g., the first blade segment 50, may particularly include a guiding device according to embodiments described herein.

According to some embodiments of the present disclosure, a wind turbine 10 including a rotor 18 is provided. Embodiments may include any of the features of a wind turbine 10 described herein. The wind turbine 10 includes a rotor hub 20 and at least one rotor blade 22 according to embodiments described herein. The rotor blade 22, particularly a first blade segment 50 of the rotor blade 22, can be connected to the rotor hub 20. A wind turbine 10 according to embodiments is illustrated for example in FIG. 7, particularly during raising or lowering of a second blade segment 52.

In some embodiments, the rotor hub 20 includes a pulley 90 inside the rotor hub 20. The pulley 90 may be configured for directing the connecting device 60 into or through a root 56 of the rotor blade 22. The pulley 90 may be a diverter pulley tool. The pulley 90 can be configured for supporting at least the weight of the second blade segment 52. In some embodiments, the pulley 90 may be removed from the rotor hub 20 after assembling or disassembling the rotor blade 22.

According to some embodiments, the rotor hub 20 includes a hub access hatch 94. The hub access hatch 94 may be configured for transferring an end of the connecting device 60 into the rotor hub 20 or out of the rotor hub 20, particularly into the rotor hub 20 towards the pulley 90 or out of the rotor hub 20 towards a winch 92 positioned outside the rotor hub 20. In particular, the winch 92 may be positioned on a support surface 14 or on a first vehicle 96, for example a truck. The first vehicle 96 can be positioned on the support surface 14. In further embodiments, a winch for winding or unwinding the connecting device may be positioned within the rotor hub.

Figure 7:
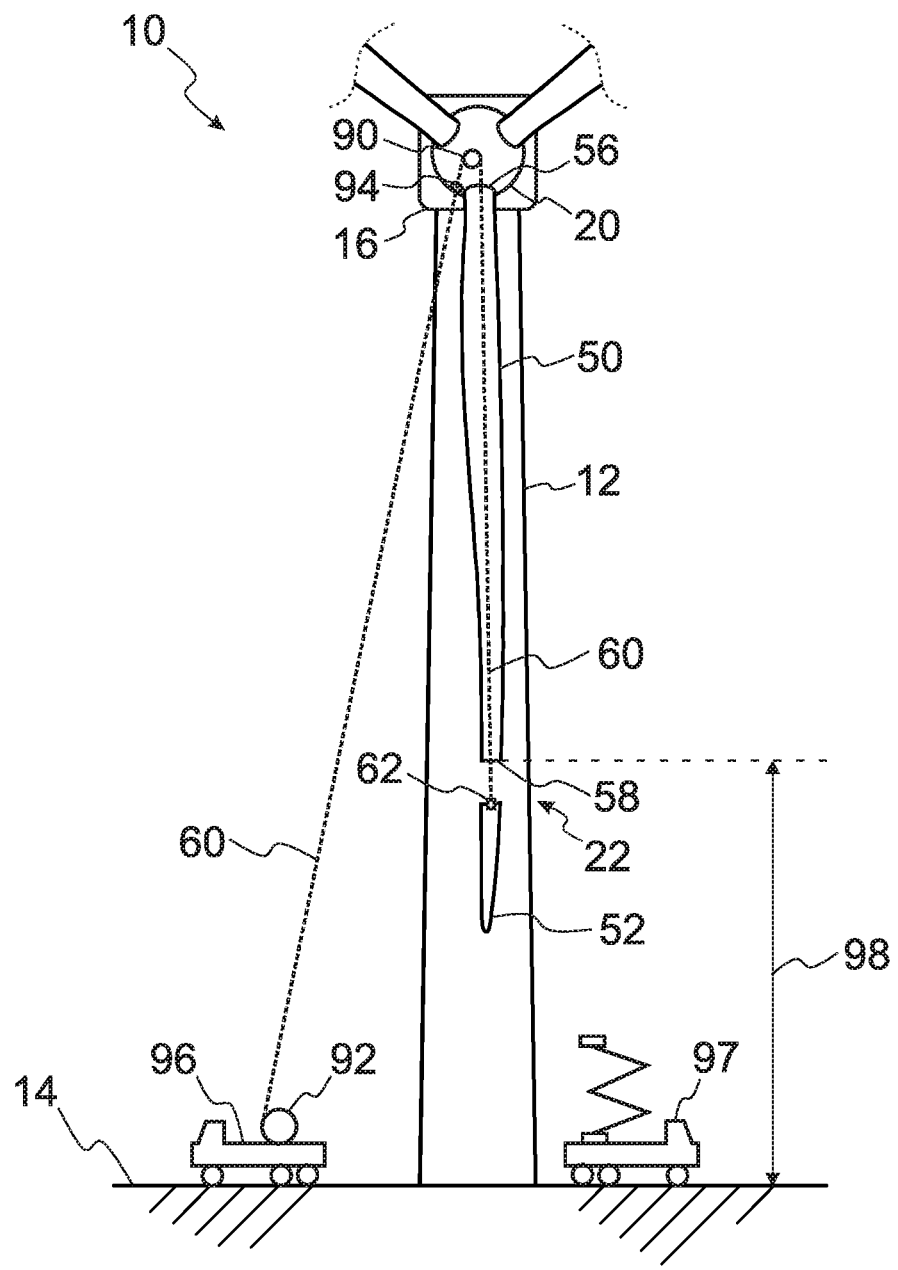
FIG. 7 illustrates a view of a wind turbine during raising or lowering of a second blade segment according to embodiments described herein.

According to some embodiments, which can be combined with other embodiments, the first blade segment 50 of the rotor blade 22 can have a length of more than 40 m, particularly more than 50 m or more than 60 m, and/or less than 130 m, particularly less than 100 m or less than 90 m. The second blade segment 52 can have a length of more than 5 m, particularly more than 7 m or more than 10 m and/or less than 40 m, particularly less than 30 m or less than 20 m. In some embodiments, a wind turbine 10 may be configured such that a blade access hatch 86 of the rotor blade 22 or a split line 58 between the first blade segment 50 and the second blade segment 52 is arranged at a blade access height 98 relative to the support surface 14, when the rotor blade 22 is oriented towards the support surface 14. For example, the blade access height 98 may be larger than 40 m, particularly larger than 50 m or larger than 60 m, and/or smaller than 120 m, particularly smaller than 110 m or smaller than 100 m. In particular, the split line 58 or the blade access hatch 86 may be reachable by service personnel using an aerial work platform 97, sometimes referred to as elevating work platform, cherry picker or bucket truck. As illustrated in FIG. 7, an aerial work platform 97 may be provided on or as a vehicle.

According to embodiments, a method of assembling or disassembling a rotor blade 22 of a wind turbine 10 is provided. For example, the wind turbine 10 and/or the rotor blade 22 of the wind turbine may include any of the features according to embodiments described herein. In particular, the wind turbine 10 includes a tower 12, a nacelle 16 mounted on the tower 12 and a rotor 18 coupled to the nacelle 16, the rotor having a rotor hub 20 and the rotor blade 22, as illustrated, e.g., in FIG. 7. The rotor blade 22 includes a first blade segment 50 connected to the rotor hub 20. The first blade segment 50 may be connected directly to the rotor hub 20. In some embodiments, the first blade segment may be connected to the rotor hub 20 via a further blade segment arranged between a root 56 of the rotor blade 22 and the first blade segment 50. The rotor blade 22 includes a second blade segment 52 configured for joining to the first blade segment 50 such that the second blade segment 52 extends from the first blade segment 50 towards a blade tip 54 of the rotor blade 22.

Figure 8:
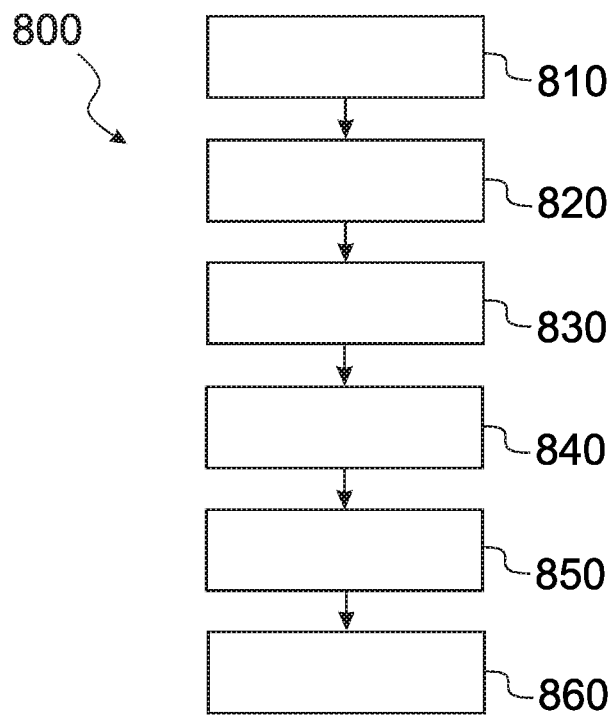
FIG. 8 illustrates a flow diagram according to embodiments of a method of disassembling a rotor blade.
Figure 9:
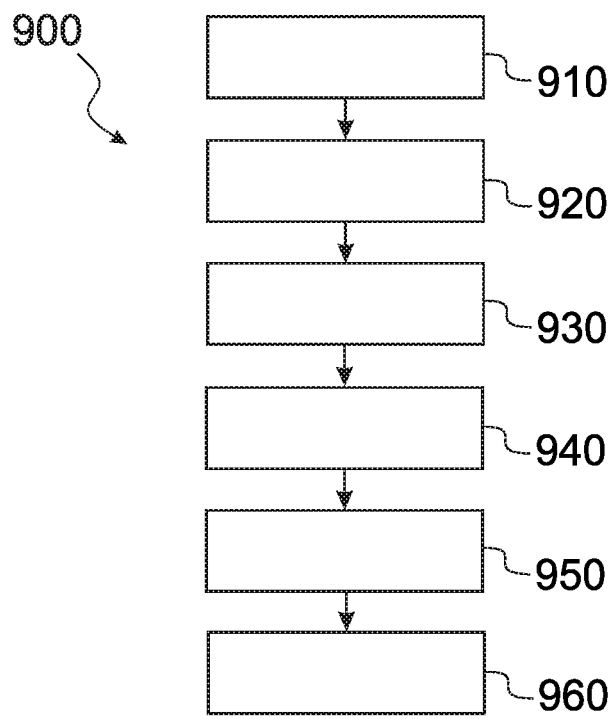
FIG. 9 illustrates a flow diagram according to embodiments of a method of assembling a rotor blade.

FIGS. 8 and 9 illustrate flow diagrams of methods according to embodiments of the present disclosure. More specifically, FIG. 8 illustrates a method 800 of disassembling a rotor blade 22, particularly in the case that the second blade segment 52 is initially joined to the first blade segment 50. FIG. 9 illustrates a method 900 of assembling a rotor blade 22, particularly in the case that initially the first blade segment 50 is connected to the rotor hub 20 of the wind turbine 10 and the second blade segment 52 is arranged on the support surface 14.

In some embodiments, the method includes orienting (810,910) the rotor 18 of the wind turbine 10 such that a blade tip 54 of the rotor blade 22 or the first blade segment 50 points towards a ground (support surface 14) beneath the rotor 18. For disassembling a rotor blade 22, the rotor blade 22 to be disassembled may be oriented or rotated towards the ground. For assembling a rotor blade, a first blade segment 50 connected to the rotor hub 20 may be oriented or rotated towards the ground.

In some embodiments, the method includes arranging (820,920) a connecting device 60 through a hub access hatch 94 of the rotor hub 20. For example, the connecting device 60 may be wound from a winch arranged on the support surface 14 or on a vehicle positioned on a ground beneath the rotor or the support surface 14, e.g. on a first vehicle 96. A first end of the connecting device 60 may be pulled up to the rotor hub 20 and through the hub access hatch 94 into the rotor hub 20. The first end of the connecting device 60 may particularly include a fastening element 82 to be fastened to a fastening device 62 of the second blade segment 52. The first end of the connecting device 60 may be pulled up using, for example, a further winch positioned in the rotor hub 20. The further winch may be less powerful than the winch 92. In further embodiments, the connecting device 60, particularly the entire connecting device 60, may be pulled up into the rotor hub 20 and a second end of the connecting device 60 may be lowered towards the support surface 14 to the winch 92. In yet further embodiments, a winch for winding or unwinding the connecting device may be positioned inside the rotor hub.

In embodiments, the method includes arranging the connecting device, particularly the first end of the connecting device 60, over a pulley 90 arranged inside the rotor hub 20. The pulley 90 may be connected to an inner wall of the rotor hub 20, e.g., to a lug mounted on the inner wall of the rotor hub 20.

According to some embodiments, the method includes guiding (830,930) the connecting device 60 through the root 56 of the rotor blade 22 and at least partially through the first blade segment 50 to the second blade segment 52. Guiding the connecting device 60, particularly the first end of the connecting device 60, to the second blade segment 52 may be assisted by a guiding device according to embodiments described herein and/or by gravity pulling the first end of the connecting device towards the second blade segment or towards the support surface 14. For disassembling a rotor blade 22, the first end of the connecting device 60 may be guided inside the first blade segment 50 to the second blade segment 52. For assembling a rotor blade 22 with the second blade segment 52 being positioned on the support surface 14, the connecting device 60 may be guided through the first blade segment 50 and further down to the support surface 14.

In embodiments, the method includes fastening (840,940) the connecting device 60 to the second blade segment 52, particularly to a fastening device 62 of the second blade segment 52. The connecting device 60 may be fastened to the fastening device 62 manually. For disassembling a rotor blade 22, service personnel may be lifted to a blade access hatch 86 of the rotor blade 22, e.g., using an aerial work platform 97. The blade access hatch 86 may be opened to access the fastening element 82 and the fastening device 62. For assembling a rotor blade 22, the second blade segment 52 may be positioned on the support surface 14. Service personnel may access the fastening element 82 and the fastening device 62 from the support surface 14. The method can include fastening the fastening element 82 of the connecting device 60 to the fastening device 62 of the second blade segment 52. For example, a bolt of the fastening element 82 may be screwed into a threaded hole of the fastening device 62, as illustrated in FIGS. 6A and 6B.

In further embodiments, the connecting device may be pre-installed in the rotor blade, particularly in the first blade segment. The connecting device may remain within the rotor blade during operation of the wind turbine. A first end of the connecting device is fastened to the fastening device. Embodiments may include connecting a second end of the connecting device to a winch. Connecting the second end of the connecting device to the winch may include arranging the connecting device over a pulley in the rotor hub and through a hub access hatch to a winch positioned on the support surface or a first vehicle positioned on the support surface. In some embodiments, the winch may be positioned inside the rotor hub. The method may include connecting the second end of the connecting device to the winch inside the rotor hub.

In some embodiments, particularly in methods of disassembling a rotor blade 22, the second blade segment 52 is joined to the first blade segment 50 by a joint 51. After fastening (840) the connecting device 60 to the second blade segment 52, the method can include pulling the connecting device 60, e.g., using the winch 92. In particular, the connecting device 60 may be pulled such that the connecting device 60 carries or can carry at least a portion of the weight of the second blade segment 52. The method can include releasing (850) the joint 51 connecting the first blade segment 50 and the second blade segment 52. In particular, a releasable locking device of the joint 51 may be released such that the second blade segment 52 is movable with respect to the first blade segment 50. For example, referring to FIGS. 6A and 6B, a joining pin 74 may be removed from a first pinhole 76 and a second pinhole 78, particularly through a pin access hatch 88, to release the pin joint.

According to embodiments of the present disclosure, methods include raising or lowering (860,950) the second blade segment 52 using the connecting device 60 fastened to the second blade segment 52, wherein the connecting device 60 extends through the root 56 of the rotor blade 22 and at least partially through the first blade segment 50 to the second blade segment 52. In particular, the second blade segment 52 may be raised or lowered without a blade-lifting crane.

For disassembling a rotor blade 22, the method 800 can include lowering (860) the second blade segment 52 towards a ground beneath the rotor 18. In particular, lowering (860) may include unwinding the connecting device 60 from the winch 92. The second blade segment 52 may be lowered for example onto the ground or onto a transport vehicle. The connecting device 60 may be disconnected from the fastening device 62. The second blade segment 52 may be repaired or serviced on site near the wind turbine 10 or may be transported to a maintenance station. The second blade segment 52 may be re-joined to the first blade segment 50 after repair or service by assembling the rotor blade 22 according to embodiments described herein. Alternatively, the second blade segment 52 may be replaced by joining a further second blade segment to the first blade segment. A further rotor blade with the first blade segment 50 and the further second blade segment may be assembled according to embodiments of the present disclosure.

For assembling a rotor blade 22, the method 900 may include raising (950) or elevating the second blade segment 52 towards the first blade segment 50. In particular, raising (950) may include winding up the connecting device 60 on the winch 92. In embodiments, the method includes joining (960) the second blade segment 52 to the first blade segment 50. For example, service personnel may be lifted to the split line 58 between the first blade segment 50 and the second blade segment 52 of the first blade segment 50. The first blade segment 50 and the second blade segment 52 may be joined by locking a joint 51, for example a releasable locking device. Referring for example to FIGS. 6A and 6B, the first blade segment 50 and the second blade segment 52 may be joined by raising and guiding the male structural member 70 into the female structural member 72. The joint 51 may be locked by inserting the joining pin 74 through the pin access hatch 88 into the first pinhole 76 and the second pinhole 78. In some embodiments, the connecting device 60 may be disconnected from the second blade segment 52 after joining (960) the second blade segment 52 to the first blade segment 50. In particular, the connecting device 60 may be disconnected by disconnecting a fastening element 82 from the fastening device 62. The connecting device 60 may be retracted through the first blade segment 50 and through the root 56 of the rotor blade 22.

According to embodiments of the present disclosure, methods of disassembling a rotor blade 22 and of assembling a rotor blade 22 described herein may be combined to a method of exchanging a second blade segment 52 of a rotor blade 22. The method of exchanging a second blade segment 52 of a rotor blade 22 may particularly include a method of disassembling a rotor blade 22 according embodiments of the present disclosure. The method may include lowering (860) the second blade segment 52 to the support surface. The connecting device 60 may be disconnected from the second blade segment 52. The method of exchanging the second blade segment 52 may proceed according to embodiments of assembling a rotor blade 22. In embodiments, the method may proceed with the further second blade segment as for the second blade segment 52, particularly with fastening (940) the connecting device 60 to the further second blade segment. The further second blade segment may be a replacement for the second blade segment 52.

According to some embodiments, the further second blade segment may have the same length and/or shape as the second blade segment. In further embodiments, the further second blade segment may be different from the second blade segment. For example, the further second blade segment may have a different length and/or different shape with respect to the second blade segment, particularly a different shape of the blade tip.

In some embodiments, the second blade segment or the further second blade segment may be exchanged at least once every two years, particularly at least once a year or at least twice a year. For example, the second blade segment may be exchanged for blade repair, blade servicing and/or to provide seasonal or site adaptations.

Embodiments of the present disclosure may provide the advantage that a rotor blade can be assembled or disassembled without a blade-lifting crane. In particular, a blade segment may be exchanged in a safe, fast and/or cost-efficient manner. Exchanging a tip segment according to embodiments can be advantageous, since tip segments are often subjected to wear due to high speeds or strong forces of the wind. Embodiments of the present disclosure may enable more regular servicing of blade segments, particularly of the tip segments. In particular, tip segments may be more easily transported to a maintenance station. Servicing at a maintenance station can improve servicing or repair quality. Embodiments of the present disclosure may advantageously enable adaptations of a rotor diameter and/or a tip shape to seasonal conditions or site conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of assembling or disassembling a rotor blade of a wind turbine, the wind turbine having a tower, a nacelle mounted on the tower and a rotor coupled to the nacelle, the rotor having a rotor hub and a rotor blade, the rotor blade having a first blade segment connected with the rotor hub and a second blade segment, wherein the second blade segment is configured for joining to the first blade segment such that the second blade segment extends from the first blade segment towards a blade tip of the rotor blade, the rotor blade further having a releasable locking device configured for joining the second blade segment to the first blade segment, the releasable locking device having a male structural member of the second blade segment, the structural member being configured for engaging a female structural member of the first blade segment for releasable locking with the female structural member, wherein a fastener of the second blade segment is arranged on the male structural member with a first end of the fastener received within a portion of the male structural member and a second end of the fastener extending from a surface of the male structural member and being connected to a connecting device, the method comprising:
raising or lowering the second blade segment using the connecting device connected to the second end of the fastener of the second blade segment, wherein the fastener extends through an opening of the female structural member beyond an end of the female structural member when the second blade segment is secured to the first blade segment at a joint, and wherein the connecting device extends through a root of the rotor blade and at least partially through the first blade segment to the second blade segment.

2. The method of claim 1, further comprising:
guiding the connecting device through the root of the rotor blade and at least partially through the first blade segment to the second blade segment; and
fastening the connecting device to the fastener of the second blade segment.

3. The method of claim 1, further comprising:
orienting the rotor of the wind turbine such that the blade tip of the rotor blade or the first blade segment points towards a ground beneath the rotor.

4. The method of claim 1, further comprising:
arranging the connecting device through a hub access hatch of the rotor hub and over a pulley arranged inside the rotor hub.

5. The method of claim 1, wherein raising or lowering the second blade segment using the connecting device further comprises winding up the connecting device on a winch or unwinding the connecting device from a winch.

6. The method of claim 5, wherein the winch is arranged inside the rotor hub or on a vehicle positioned on a ground beneath the rotor.

7. The method of claim 1, further comprising:
releasing the joint connecting the first blade segment and the second blade segment, wherein the second blade segment is lowered towards a ground beneath the rotor.

8. The method of claim 1, wherein the second blade segment is raised towards the first blade segment, the method further comprising:
joining the second blade segment to the first blade segment.

9. A rotor blade for a wind turbine, the rotor blade comprising:
at least two blade segments comprising a first blade segment and a second blade segment joined to the first blade segment, the second blade segment extending from the first blade segment towards a blade tip of the rotor blade; and
a releasable locking device configured for joining the second blade segment to the first blade segment, the releasable locking device comprising a male structural member of the second blade segment, the male structural member being configured for engaging a female structural member of the first blade segment for releasable locking with the female structural member,
wherein the rotor blade is configured for receiving a connecting device such that the connecting device extends through a root of the rotor blade and at least partially through the first blade segment to the second blade segment, and wherein the second blade segment comprises a fastener for fastening the connecting device to the second blade segment, wherein the fastener is arranged on the male structural member of the second blade segment with a first end of the fastener received within a portion of the male structural member and a second end of the fastener extending from a surface of the male structural member, the second end of the fastener being connected to the connecting device, and wherein the fastener extends through an opening of the female structural member beyond an end of the female structural member when the second blade segment is secured to the first blade segment at a joint comprising the releasable locking device.

10. The rotor blade of claim 9, wherein the fastener is arranged inside the rotor blade.

11. The rotor blade of claim 9, wherein the rotor blade comprises a blade access hatch configured for accessing the fastener from outside the rotor blade.

12. The rotor blade of claim 9, further comprising a guiding pipe extending along a longitudinal direction of the rotor blade, the guiding pipe being configured for guiding the connecting device to the fastener of the second blade segment.

13. The rotor blade of claim 9, wherein the second blade segment is a tip segment comprising the blade tip of the rotor blade.

14. The rotor blade of claim 9, wherein the releasable locking device comprises at least one of a pin joint, a bolted joint, or a flange joint.

15. A wind turbine comprising a rotor, the rotor comprising a rotor hub and the rotor blade of claim 9, the rotor blade being connected with the rotor hub.

* * * * *